A. G. CRITCHFIELD.
HAND FRUIT PICKER.
APPLICATION FILED AUG. 6, 1913.
1,151,441.
Patented Aug. 24, 1915.
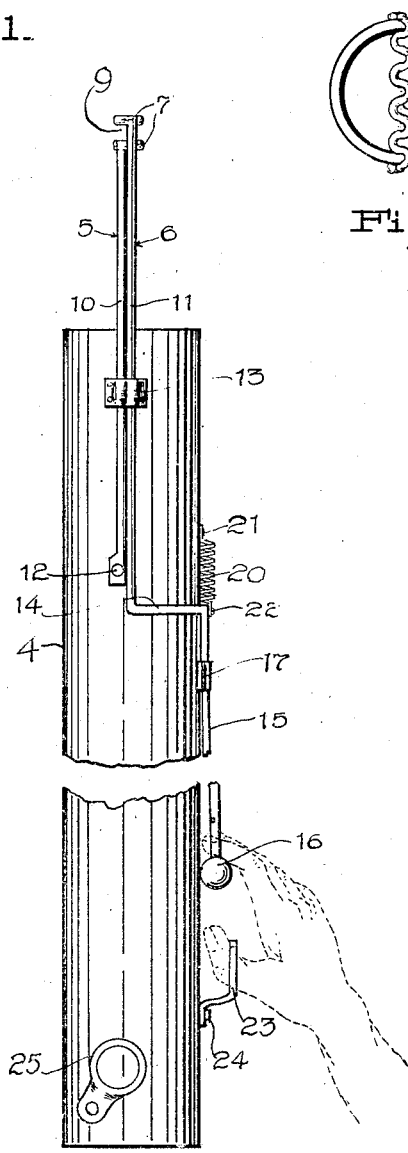
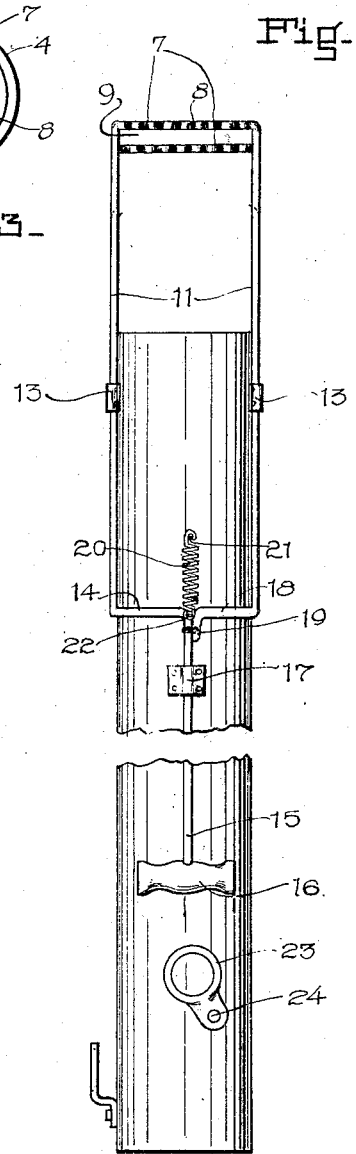
Witnesses
C. P. Newbold
Chas J. Chunn
Inventor
Albert G. Critchfield.
By
Attorney

UNITED STATES PATENT OFFICE.

ALBERT G. CRITCHFIELD, OF LENTS, OREGON.

HAND FRUIT-PICKER.

1,151,441.  Specification of Letters Patent.  Patented Aug. 24, 1915.

Application filed August 6, 1913. Serial No. 783,425.

*To all whom it may concern:*

Be it known that I, ALBERT G. CRITCHFIELD, a citizen of the United States, residing at Lents, in the county of Multnomah and State of Oregon, have invented certain new and useful Improvements in Hand Fruit-Pickers; and I do hereby declare the following to be a full, clear, and exact description of the invention, such as will enable others skilled in the art to which it appertains to make and use the same.

My invention relates to new and useful improvements in fruit pickers, and has particular reference to that type which are operated by hand and resides in the provision of novel means for picking the fruit without in any way injuring it or the tree.

An important object of my invention is to provide a device of the above mentioned character which employs a fixed gathering member and a sliding gathering member coöperating with the fixed member during the operation of picking the fruit, constructed in such a manner as to prevent the fruit from becoming bruised, as well as to prevent the unnecessary mutilation of the limbs of the tree bearing fruit.

A further important object of my invention is to provide a device of the above mentioned character, which is constructed of few parts, reliable in its operation, and cheap to manufacture.

The above and additional objects are accomplished by such means as are illustrated in the accompanying drawings, described in the following specification, and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a side elevation of my device in assembled operative position and illustrating the manner in which it is operated, Fig. 2 is a front elevation illustrating the device in assembled position. Fig. 3 is an end elevation illustrating the relationship of the gathering members.

Referring now more particularly to the drawings forming a part of this specification and in which like numerals are employed to designate like parts throughout the same, the numeral 4 designates as an entirety a hollow cylindrical pipe, forming the body portion of my device, and provides means for delivery of the fruit from the trees in the manner which will be hereinafter more fully described.

The picking or gathering mechanism consists of a fixed picker 5 and a reciprocating picker 6, that are each formed of a single piece of suitable metal, and provided with a plurality of picking fingers 7, that are formed by bending the members 5 and 6 intermediate their ends to provide convolutions 8 which extend at right-angles with relation to the members 5 and 6. The fingers 7 of the member 6 are disposed above the fingers of the member 5 in spaced relation thereto, to provide a space 9 through which the fruit is adapted to be inserted for the purpose of picking it.

The members 5 and 6 are provided with the side portions 10 and 11 respectively and the side members 10 of the member 5 are bolted or otherwise suitably secured to the cylindrical member 4, as indicated at 12, at their free terminals, upon opposite sides and centrally of the member 4. A clamping plate 13 is secured adjacent the upper terminal of the member 4 for the purpose of holding the member 5 in operative position.

The side members 11 of the reciprocating member 6 are slidably mounted within the clamping plate 13 and engage the side members 10 of the picker 5.

One of the side bars 11 continues in a laterally bent portion 14, which is curved to conform to the shape of the member 4 and continues in an integrally formed handle portion 15 which extends at right angles to the portion 14 and is provided at its outer terminal with a laterally disposed gripping handle 16 which is suitably secured thereto and adapted for engagement with the hand of the operator. A clamping plate 17 is mounted upon the member 4 adjacent the inner terminal of the handle portion 15 and serves to retain the handle portion in operative position upon the member 4.

The other of the side members 11 of the reciprocating picker 6, is provided with an integrally formed laterally extending portion 18 which is curved to conform to the shape of the member 4 and bent at its free terminal in a plane parallel with the handle member 15 and into engagement therewith in order to provide for the securing thereof to the handle portion 15 by means of a rivet 19 or any suitable fastening means.

As a means for returning the reciprocating picker 6 into its operative position with relation to the picker 5, this invention employs a spring 20, which is secured at one terminal to a pin 21 formed on the member 4 and its other terminal to a pin 22 formed on the upper terminal of the handle member 15.

As a means for maintaining the hand of the operator in the proper position for engaging the gripping portion 16 of the handle 15, this invention employs a thumb engaging member 23, which is suitably secured to the member 4 in spaced relationship thereto by means of a bolt 24 or any suitable fastening means, and is disposed directly below the gripping handle 16, in order that the thumb of the operator may be engaged by the member 23 and the fingers of the operator may engage the gripping handle 16 during the operation of picking the fruit in trees. A similarly constructed thumb engaging member 25 is disposed adjacent the lower terminal of the member 4 and is adapted to receive the thumb of the free hand of the operator in order that the hand and fingers may be placed over the opening in the member 4 to catch the fruit which falls through the member 4 after being picked.

The operation of my device may be briefly described as follows: The operator grasps the picker by the thumb engaging portion after the manner which has been hereinbefore described and operates the fingers 7 so that the twigs bearing the fruit will be inserted within the space 9 between the fingers and the fruit is then ready to be picked or removed from the twig. A downward pull is then given the gripping handle portions 15 and 16 against action of the spring 20, whereby the fingers of the reciprocating picker 6 move downwardly with relation to the fingers of the fixed picker, causing the fruit to be pulled from the twig bearing the same, whereupon the fruit will fall into the adjacent member 4 and thence therethrough and into engagement with the hand of the operator, which is as above stated, placed over the opening at the lower end of the member 4 to catch the fruit. The action of the spring 20 tends to return the fingers 7 into operative relationship with the fingers of the other picker.

It will thus be seen that a picker is provided, which is adapted to pick one or more pieces of fruit at a time, and it is obvious that any number of teeth may be employed, thereby affording means for picking a large quantity of fruit simultaneously.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus described my invention, what is claimed is:

The combination with an elongated hollow body having its upper end open, of stationary arms secured to opposite sides of the body and extending outwardly from the open end thereof, a fixed fruit picking member connected with the outer ends of the arms and extending transversely of the open end of the body, arms slidably mounted on opposite sides of the body, engaging and being disposed parallel to said stationary arms, said slidable arms terminating beyond the outer ends of the stationary arms and a movable fruit picking member connected with the outer ends of the slidable arms and being disposed in normal parallel relation to said stationary fruit picking member, said fixed and movable fruit picking members arranged to engage a fruit stem.

In testimony whereof I affix my signature in presence of two witnesses.

ALBERT G. CRITCHFIELD.

Witnesses:
 JACOB TRUST,
 W. ALLEN.